3,228,773
METHODS FOR PRODUCING TEMPEH
Clifford W. Hesseltine, Glen Haven, and Alcides Martinelli, Jr., Peoria, Ill., assignors to the United States of America as represented by the Secretary of Agriculture
No Drawing. Filed Dec. 13, 1962, Ser. No. 244,528
4 Claims. (Cl. 99—98)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the production of the Indonesian food product tempeh prepared from soybeans in which the soybeans are fermented as whole dehulled beans or in the form of grits by microorganisms.

More particularly this invention concerns the production of the soybean food, tempeh, by the fermentation of dehulled soybeans or soybean grits with pure cultures of appropriate fungi. Heretofore, this traditional Indonesian food has been prepared by the inoculation of soybeans with a starter comprising pieces of old tempeh containing a mixture of molds, bacteria and other microorganisms.

Tempeh, a fermented soybean preparation, has been used for centuries as a valuable and important food product in Indonesia. It contains proteins, carbohydrates, fats, vitamins, and other nutrients. Tempeh is prepared in Indonesia in small factories by soaking whole soybeans in water, or in streams of water overnight. The soaked wet beans are then dehulled either by hand or by treading bare-footed on the beans in baskets and allowing the flowing water to remove the hulls. The dehulled soybeans are then boiled for sometime in water which softens the beans and destroys contaminating microorganisms. The thusly cooked soybeans are then spread out in thin layers in order to allow the water to drain and evaporate from the surface of the soybeans. The air-cooled soybeans are next mixed with the starter or inoculum consisting of molded soybean material from a previous tempeh fermentation. The moist inoculated soybeans are then wrapped tightly in banana leaves and the material is allowed to ferment at room temperature until the soybeans are completely molded, the thusly molded soybeans being the product known as tempeh. The consumer slices the tempeh into thin slices, dips the slices in a salt solution and fries them in a vegetable oil.

The fermentation of the soybeans destroys the bad odor and flavor of the soybeans. The fermentation apparently allows the microorganism to produce enzymes which act on the proteins, carbohydrates and the oil to make the tempeh palatable and nutritious and to give a desirable flavor. The microorganisms mainly responsible for the tempeh fermentation are stated to be *Rhizopus oryzae* and *Aspergillus oryzae*. These organisms require aeration for growth and the formation of enzymes.

The prior art soybean fermentation for the manufacture of tempeh has various objectionable steps. Since the required organisms are aerobic, the mass of soybeans which can be fermented heretofore has been restricted in size to a small mass of molded soybeans and requires much hand labor. The mass of soybeans being fermented must be covered by some film. The use of plant leaves such as banana leaves is extremely primitive, and the molded cake is irregular in shape and size. Such covering also grossly contaminates the fermentinng soybeans. The use of plant leaves restricts the areas where the product can be made to the tropics. The progress of the fresh fermentation is uncertain and the tempeh produced is highly variable as a consequence of using an inoculum consisting of a piece of old tempeh which is contaminated by all sorts of molds, bacteria and yeasts. This causes a highly variable food product which can even be spoiled and highly toxic to humans. Since the inoculum is highly variable as to the viability of the mold even when the inoculum is relatively pure, fermentation time requirements for the formation of tempeh are also extremely variable, as is the product itself.

Another objectionable and unsanitary procedure is the prolonged soaking required for the traditional removal of the soybean seed coats. All of these lengthy process steps restrict even the Indonesian use of tempeh as a food, and would obviously also restrict or prevent its commercial introduction and acceptance in the United States and other western countries.

Thus, the principal object of our invention is a commercially practicable process for forming consistently uniform batches of high quality tempeh.

Another object is a process for producing tempeh in consumer-size protective containers in which it can be sold.

Other objects will become apparent upon a reading of the following detailed specification and the claims.

The preparation of tempeh by the improved process of our invention has been found to be brought about by the fermentation of soybeans by certain phycomycetous fungi of the order Mucorales. This order is described by Bessey, Morphology and Taxonomy of Fungi, pages 150-172, Blakiston Company, Philadelphia, 1950. The order includes a number of genera including Mucor, Rhizopus, Absidia, Phycomyces, and Thamnidium. Among the several genera in this order, the genus Rhizopus has been found to be the most useful and preferred in the process of our invention. Species of this genus which are operative in our invention include, for example, respectively *Rhizopus oligosporus*, NRRL 2710, *R. arrhius*, NRRL 1556, *R. achlamydosporus*, NRRL A–6997, *R. formosaensis*, NRRL A–10,180, *R. stolonifer*, NRRL 2233, and *R. oryzae*, NRRL A–6865.

In order to prepare spore inoculum for inoculating soybeans as above mentioned, a preferred said species is grown on a medium containing potato extract, magnesium sulfate, calcium carbonate, glucose, tap water, and agar. This medium, called potato dextrose agar is described by Haynes et al., Applied Microbiology 3, 361 (1955). The medium is dispensed in test tubes, sterilized with heat, cooled, and inoculated with a pure culture of one of the said species of Rhizopus. When the Rhizopus has grown for 7 days at 25° C.–280° C., large numbers of sporangia are produced, and the sporangiospores may then be washed off the potato dextrose agar slant mold colony and the spore suspension used to inoculate the soybeans.

The only material needed for the tempeh fermentation, aside from water and inoculum, is soybeans. We have examined a number of U.S. and Japanese soybean varieties, and each will make satisfactory tempeh when fermented with a pure culture of Rhizopus. The soybeans may be soaked in water overnight and the seed coats removed, or the soybeans may be mechanically dehulled and cracked into full-fat grits. The latter, namely soybeans that have been dehulled and cracked into large grits (10–15 pieces per bean) is preferred substrate for preparing tempeh according to this invention. The soybean must be softened and moistened by soaking in water and then boiled in order to sterilize and further soften the substrate. After cooking, the material is drained of excess water, cooled below 40° C., and inoculated with a spore suspension of the Rhizopus spores prepared as described above.

The temperature at which tempeh may be fermented in our improved method can vary from 25 to 37° C.

We have now discovered methods of fermenting soybeans in unlimited amounts rapidly, under sanitary conditions, to yield a uniform and pre-packaged product that may be frozen for delayed consumption. The sterilized full-fat grits or whole-dehulled soybeans after inoculation with sporangiospores from an above described pure culture may be fermented in conventional non-toxic plastic bags such as those used for retailing of food but modified by the presence of 0.02 in. diameter perforations located not over 0.5 in. apart. When these flexible plastic containers are perforated as described, an ideal fermentation container for the fermentation of soybeans to tempeh is formed. The sterilized inoculated soybean material is packed in the plastic containers, the end of the plastic bag heat sealed, and the soybeans are fermented in the package in which it is to be sold. Because of the very low bacterial count and substantially sterile condition of the food grade plastic sack, we have found that we can successfully ferment soybeans to tempeh without sterilization of the plastic container as it comes from the manufacturer.

A further modification of our invention is the fermentation in similarly perforated flexible plastic tubing. The diameter of the plastic tubing is limited only by the requirement that sufficient air reaches the center for mold growth. The fermentation of the dehulled soybeans to tempeh can again be carried out without explicit sterilization of the plastic material. In addition a plastic tube of tempeh may be sliced by the consumer to give thin slices of tempeh which when fried provide a very appetizing product.

The following specific examples are illustrative of the procedures described.

Example 1

In this fermentation Hawkeye variety soybeans were used. Dehulled whole bean halves and grits respectively were used. The beans, in the latter case, were crushed between rollers into full-fat grits, the particle size of which represented about 1/10 to 1/15 of the dehulled soybean. Both forms of soybeans were soaked in tap water at 25° C. The soybean halves were soaked overnight while the grits were soaked for 3 to 4 hours. About 3,000 ml. water was used for every 1,000 g. of soybean material. The soaking water was discarded, and then the soybeans were boiled without pressure in excess water for ½ hour. The water was drained, and the soybean halves or grits placed on a sterile absorbent surface to drain further and to cool. The drained bean materials were now swollen and soft. After cooling, each bean material was inoculated with spores of the mold, *Rhizopus oligosporus* NRRL 2710 in the following manner: two ml. of sterile water was added to a sporulated culture of the organism on a potato dextrose agar slant and the wash water then poured onto 100 gms. of soybean substrate. For larger amounts of soybean substrate a proportionate number of tubes was employed. After the beans or grits had been inoculated and mixed, 500 gm. portions of the inoculated soybean material was placed in each of a number of perforated plastic bags (each 22 x 13 cm.). The plastic bags had 0.02 in. perforations spaced 0.5 in. apart. The suitably filled bags were manually closed and heat-sealed and placed in an incubator at 31° C. After 22–23 hours of incubation the fermentation was finished. The tempeh had an excellent color, excellent flavor, and excellent odor.

Example 2

The soybeans or grits were soaked, cooked, and inoculated as in Example 1. The swollen material was packed in perforated cellophane tubes having a diameter of 9 cm. The perforations characteristics were the same as in Example 1. Perforated cellophane tubes having a convenient length of approximately 28 cm. held approximately 500 g. of soybeans. These tubes were allowed to ferment in an incubator at 31° C. for 22–23 hours. The tempeh of this example also had an excellent appearance, excellent flavor, excellent odor, and a light color.

Example 3

In the case of plastic bags and cellophane tubes several distances between the perforations were tested using distances of 0.25, 0.6, 1.3 (0.5 in.), 2.5, and 4.5 cm. In those containers with 4.5 cm. between each perforation only in the areas surrounding the perforations did the mold growth appear; the remaining mass of soybeans was unfermented. Approximately the same results were found in the containers where the distance between the perforations was 2.5 cm. although here the growth of the mold was somewhat more pronounced. On the other hand, containers having perforation distances of 0.25, 0.6, and 1.3 cm. produced indistinguishably excellent tempeh. In the absence of perceptible advantages with perforations spaced less than 1.3 cm. apart, it appears needless to provide a larger number of perforations.

Example 4

Perforated plastic bags of inoculated soybeans were prepared as in Example 1 and placed at six different temperatures for fermentation, namely, 20, 25, 28, 31, 37, and 44° C. This was to determine the optimal fermentation temperature. Excellent tempeh was formed in each fermentation excepting those at 20° C. and 44° C. The time required for excellent tempeh to be formed was 80 hours at 25° C., 26 hours at 28° C., and 22 to 24 hours at 31° C. to 37° C. Thus, tempeh can be made over a considerable range of temperatures, and the one selected would depend on conditions in a particular factory.

Example 5

Several perforated plastic bags and tubes containing inoculated soybeans were prepared as in Examples 1 and 2. However, instead of placing them in an incubator for fermenting, half were kept in a refrigerator at 5° C.; and the others in a deep freezer at −15° C. for periods of 1 to 5 weeks. They were then removed and placed in a 31° C. incubator and allowed to ferment. A good fermentation occurred in each container and excellent tempeh was formed similar to tempeh inoculated and immediately fermented. Those containers stored at 5° C. and then fermented reqiured 22 hours of incubation before the fermentation was complete. For those stored at various intervals in a deep freezer, a longer fermentation time of from 36 to 38 hours was reqiured. This naturally included the time required for the soybeans to thaw out and reach the fermentation temperature.

We claim:

1. Method for producing uniform batches of highly edible and nutritous tempeh comprising the steps of inoculating under aseptic conditions a cooked, hydrated, and swollen medium selected from the group consisting of drained dehulled soybean halves and drained soybean grits with 2 ml. per 100 g. of said soybean material of an aqueous wash suspension of Rhizopus spores grown on a potato dextrose agar slant, packing the Rhizopus-inoculated unfermented soybean material into a container selected from the group consisting of perforated plastic bags, and perforated plastic tubing, the perforations of said perforated members being 0.02 inch in diameter and not more than 1.3 cm. apart, and incubating at 25 to 37° C. for about 22 hours.

2. The method of claim 1 wherein about 500 gm. of the Rhizopus-inoculated soybean material is packed into a 13 x 22 cm. plastic bag having perforations as defined in claim 1, the bag then being sealed by heating the lips thereof, and the sealed bag is incubated at 31° C. for about 22 hours.

3. The product produced by the method of claim 2.

4. The method of claim 1 wherein about 500 gm. of the Rhizopus-inoculated soybean material is packed into perforated viscose tubing about 9 cm. in diameter and about 28 cm. in length and having 0.02 in. perforations that are 1.3 cm. apart, heat-sealing the lips of the packaged tubing, and incubated at 31° C. for about 22 hours.

No references cited.

A. LOUIS MONACELL, *Primary Examiner.*

S. J. BAICKER, *Assistant Examiner.*